United States Patent
Verhee et al.

(10) Patent No.: US 8,210,600 B1
(45) Date of Patent: Jul. 3, 2012

(54) AERODYNAMIC PACKAGE FOR AN AUTOMOTIVE VEHICLE

(75) Inventors: Patrick Verhee, Cologne (DE); Stefan Lamm, Cologne (DE); Andrea Di Buduo, Cologne (DE); Kemal Curic, Dortmund (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/985,167

(22) Filed: Jan. 5, 2011

(51) Int. Cl.
*B62D 35/00* (2006.01)
(52) U.S. Cl. .................................................. 296/180.1
(58) Field of Classification Search ............... 296/180.1, 296/146.8, 56; D12/181
See application file for complete search history.

(56) References Cited

U.S. PATENT DOCUMENTS

| | | | | |
|---|---|---|---|---|
| 2,036,560 A | * | 4/1936 | Backus | 296/180.1 |
| 4,455,045 A | * | 6/1984 | Wheeler | 296/181.5 |
| 4,653,795 A | * | 3/1987 | Soderberg | 296/180.1 |
| 4,673,206 A | * | 6/1987 | Kretschmer et al. | 296/180.1 |
| 4,778,212 A | * | 10/1988 | Tomforde | 296/180.1 |
| 4,810,021 A | * | 3/1989 | Burst | 296/180.1 |
| 4,976,489 A | * | 12/1990 | Lovelace | 296/180.1 |
| 5,139,304 A | * | 8/1992 | Tajiri | 293/117 |
| 5,382,070 A | * | 1/1995 | Turner | 296/180.1 |
| 5,419,608 A | * | 5/1995 | Takemoto | 296/180.1 |
| 5,511,847 A | * | 4/1996 | Weisbarth et al. | 296/180.1 |
| 5,513,893 A | * | 5/1996 | Nakata et al. | 296/180.1 |
| 5,692,796 A | * | 12/1997 | Yamamoto et al. | 296/180.1 |
| 5,845,960 A | * | 12/1998 | Koike et al. | 296/180.1 |
| 5,863,090 A | * | 1/1999 | Englar | 296/180.1 |
| 6,033,010 A | * | 3/2000 | Preiss | 296/180.1 |
| 6,435,298 B1 | * | 8/2002 | Mizuno et al. | 180/346 |
| 6,447,049 B1 | * | 9/2002 | Tohda et al. | 296/180.1 |
| D483,311 S | * | 12/2003 | Kasahara et al. | D12/196 |
| D491,851 S | * | 6/2004 | Perfetti et al. | D12/181 |
| D543,914 S | * | 6/2007 | Lai | D12/181 |
| 7,226,117 B2 | * | 6/2007 | Preiss | 296/180.1 |
| D559,160 S | * | 1/2008 | Viandante et al. | D12/181 |
| 7,364,330 B2 | * | 4/2008 | Nahm et al. | 362/496 |
| 7,490,891 B2 | * | 2/2009 | Terakawa et al. | 296/180.1 |
| 7,661,753 B2 | | 2/2010 | Shinedling et al. | |
| 7,883,140 B2 | * | 2/2011 | Wurfel et al. | 296/191 |
| 7,895,703 B2 | * | 3/2011 | Ina et al. | 15/250.3 |
| 7,938,474 B2 | * | 5/2011 | Bang | 296/180.1 |
| 2006/0043770 A1 | * | 3/2006 | Preiss | 296/180.1 |
| 2006/0290169 A1 | * | 12/2006 | Fukushima et al. | 296/180.1 |
| 2009/0085371 A1 | * | 4/2009 | Nagahama | 296/180.5 |
| 2011/0095562 A1 | * | 4/2011 | Yamagishi et al. | 296/180.1 |

FOREIGN PATENT DOCUMENTS

EP          0290614      * 11/1988

* cited by examiner

*Primary Examiner* — Glenn Dayoan
*Assistant Examiner* — Gregory Blankenship
(74) *Attorney, Agent, or Firm* — Frank A. MacKenzie; Brooks Kushman P.C.

(57) ABSTRACT

A vehicle having an aerodynamic splitter for the front of a vehicle is provided. The splitter includes a splitter panel which has a top surface adapted to be mounted to a front fascia of a vehicle. The top surface is contoured and offset from the front fascia in order to define an airflow opening between the front fascia and the splitter panel. The airflow opening directs air under the vehicle therethrough in order to create a down force on the vehicle.

19 Claims, 4 Drawing Sheets

AERODYNAMIC PACKAGE FOR AN AUTOMOTIVE VEHICLE

TECHNICAL FIELD

The present invention relates to an aerodynamic package for an automotive vehicle.

BACKGROUND

Aerodynamic airflow considerations are a priority of vehicle body design. Effective airflow management over a vehicle body can be critical in meeting functional demands for passenger compartment acoustics, fuel efficiency and safety of passenger type vehicles. Aerodynamic design also enhances vehicles control and improves speed of passenger vehicles. Front splitters are a common aerodynamic used to controls airflow around the vehicle and limit front end lift and creates downforce.

A front splitter is typically found on the front-end of a vehicle and appears as a flat extension to the bottom of the front bumper. Typically, the splitter is rigid and extends straight out, parallel to the ground and is attached to the bumper with support rods to ensure the front splitter remains forward of the bumper and parallel to the ground.

Depending on its positioning, a front splitter can limit how much air is directed under the vehicle by slicing through the incoming air stream and directing a portion of the airflow over the vehicle body. A front splitter can helpful in preventing front end lift as well as providing downward force on the vehicle. The overall reduced lift and increased down force is created by the flat extension slicing through oncoming air and restricting airflow along the underbody of the vehicle.

To understand how a typical splitter prevents lift and creates downward force it is helpful to understand the fluid dynamics as oncoming air approaches the front of a vehicle. When oncoming air reaches the front of the vehicle it must come to a stop before it turns to move either up and over, down and under, or around the vehicle. Thus the front of the moving vehicle is an area of relatively high pressure.

The relatively high pressure at the front of a moving vehicle pushes back on the vehicle creating drag. By extending a front splitter out from the front of the vehicle, the high pressure will also push down on the top of the splitter.

Also, the typical front splitter extends below the bumper close to the road and air flowing underneath the front splitter and vehicle creates somewhat of a Venturi effect, based on Bernoulli's equation, where pressure is decreased as air is forced through a constriction and speeds up in velocity. Thus the region between the splitter and the pavement is an area of low pressure. This adds up to a downward force on the splitter.

The resultant dynamic downward force generally helps the driver to retain control of the vehicle at higher road speeds. A front splitter is typically associated with racing vehicles. However, the aerodynamic principles also apply to passenger vehicles. But there are several factors which limit a typical front splitter's aerodynamic effectiveness on a passenger vehicle. Additionally, front splitters for passenger vehicles must be to have adequate ground clearance to accommodate suspension and body movement over dips and potholes, which makes typical splitters aerodynamically effective. Design considerations for front splitters are for passenger vehicle are also restricted by government regulations which typically limit how far a front splitter may protrude beyond the bumper of a vehicle.

Utility vehicles, such as sport utility vehicles and pickup trucks, have also been popular in recent years. As utility vehicles have become popular for utilization as passenger vehicles, manufacturers of utility vehicles have incorporated many features into utility vehicles to enhance fuel efficiency, safety and control at high speeds.

Utility vehicles are often designed for travel through rough terrain. Additionally, utility vehicles are generally designed to haul cargo, whether in a cargo compartment, a bed of the vehicle, or by towing cargo with a trailer. In order to meet these extreme design requirements, utility vehicles are often provided with a vehicle body that is elevated greater than conventional passenger vehicles. In order to meet the fuel efficiency and safety standards while maintaining the elevated cargo compartments in utility vehicles, front end airflow management of utility vehicles is required.

SUMMARY

At least one embodiment of the present invention provides an aerodynamic splitter for the front of a vehicle. The splitter includes a splitter panel which has a top surface adapted to be mounted to a front fascia of a vehicle. The top surface is contoured and offset from the front fascia in order to define an airflow opening between the front fascia and the splitter panel. The airflow opening directs air under the vehicle therethrough in order to create a down force on the vehicle.

Another embodiment provides that the front fascia has a bumper and a grille. A leading edge of the splitter panel does not extend forward of the front fascia.

A further embodiment provides that the splitter panel has a bottom surface contoured to define an elongated recess along a central portion of the splitter panel.

An even further embodiment provides that the contoured central recess is defined by a pair of wall portions along the bottom surface. The wall portions are angled outboard and downward from the central recess.

Another embodiment provides that the bottom surface includes a second wall portion connected to the first wall portion. The second wall portion is angled outboard and upward from the first wall portion to define a pair of convex protrusions along the bottom surface.

Yet another embodiment provides that the airflow opening is defined at least along the top surface corresponding to the elongate recess.

Still another embodiment provides that the splitter includes at least two attachment arms extending from the top surface. The attachment arms are adapted to attach the splitter to the bumper.

A further embodiment provides that the airflow opening is defined between the attachment arms.

An even further embodiment provides that the top surface is contoured to be generally parallel to the bottom surface.

Another embodiment provides that the convex protrusions are angled forward.

At least one embodiment of the present invention provides a vehicle having an aerodynamic front splitter. The vehicle includes a front fascia have a front grille and a front bumper. A front splitter panel is adapted to be mounted adjacent a lower surface of the front fascia along a top surface of the splitter panel. The splitter panel is mounted an offset distance from the front bumper to define an airflow opening between the front fascia and the top surface of the splitter panel. Air is thereby directed under the vehicle through the airflow opening.

Another embodiment provides that the splitter has a bottom surface contoured. The bottom surface is contoured to define an elongated recess along a central portion.

A further embodiment provides that that the vehicle includes rear fins disposed below the rear bumper.

An even further embodiment provides that the vehicle includes a rear spoiler mounted adjacent a roof of the vehicle.

Another embodiment provides that the rear spoiler is integrally formed in a rear body panel to define a rear airflow opening.

Yet another embodiment provides that the rear spoiler is formed with a high-mount stoplight, the airflow opening formed between the stoplight and the rear body panel.

At least one embodiment of the present invention provides a splitter panel adapted to be mounted to a front fascia of a vehicle along a top surface of the splitter panel. The splitter panel includes a bottom surface contoured to define an elongated recess along a central portion, the panel mounted an offset distance from the front bumper to define an airflow opening between the front bumper and the splitter panel in order to direct air under the vehicle through the airflow opening.

Still another embodiment provides that the splitter panel does not extend forward of the front fascia.

Yet another embodiment provides that the bottom surface is contoured to define an elongate recess along a central portion of the splitter panel. The elongate recess is defined by a pair of convex protrusions extending from the bottom surface. The convex protrusions are located along a pair of distal ends of the splitter panel.

A further embodiment provides that the top surface is contoured to create a downward force on the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
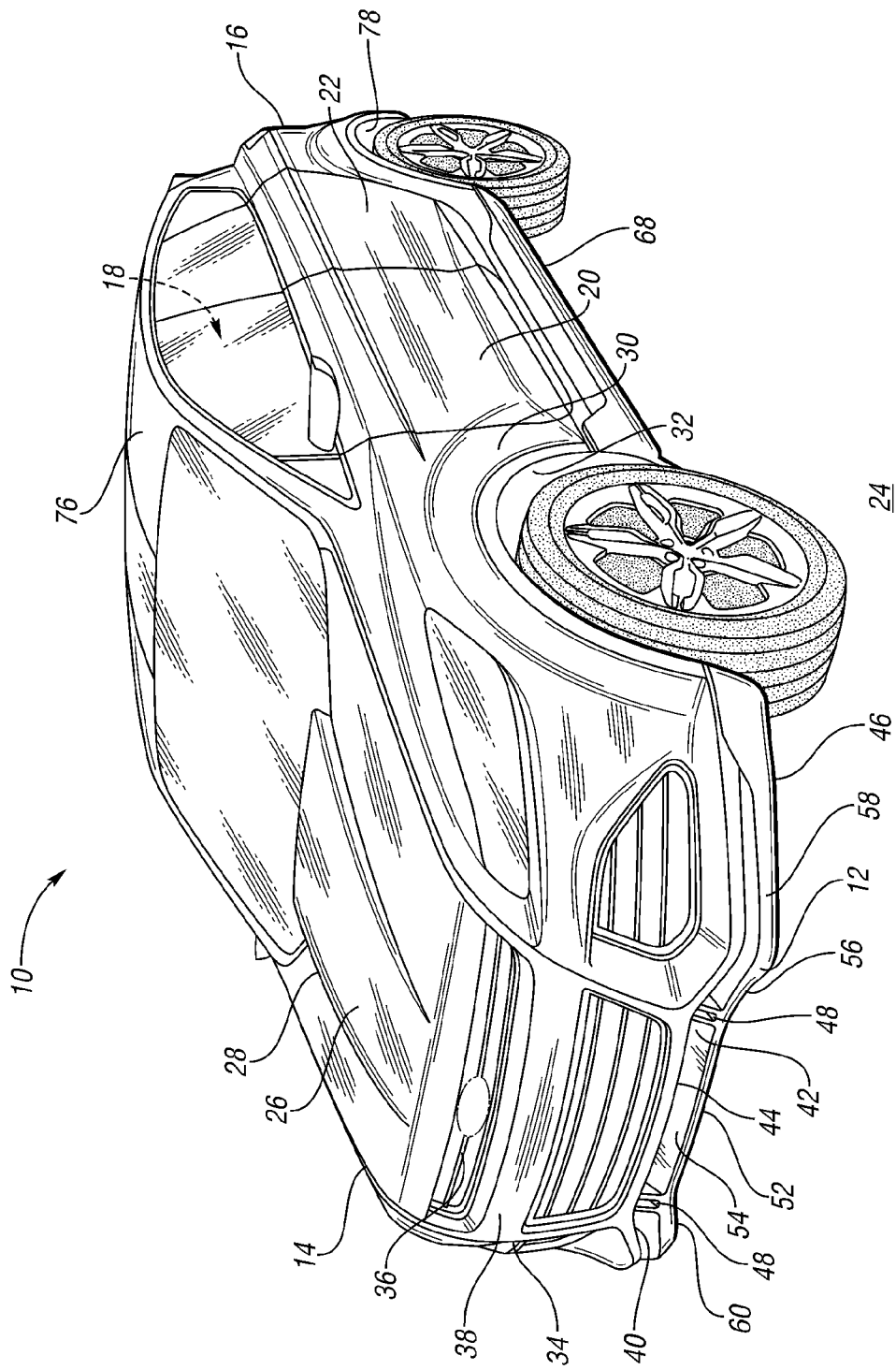
FIG. 1 is a perspective view of a passenger vehicle in accordance with an embodiment of the present invention.

FIG. 1 illustrates a perspective view of a passenger vehicle 10 including a front splitter panel 12 according to an embodiment of the present invention.

The vehicle 10 includes a front end 14 and a rear end 16 with a passenger compartment 18 provided therebetween. The passenger compartment 18 of the depicted embodiment may include two rows for passenger seating, for example, a front row and a back row (not shown). The front row and the back row may each include a pair of doors on opposed lateral sides of the vehicle 10, such as a front side door 20 and a back side door 22 illustrated in FIGS. 1 and 2. The side doors 20, 22 are illustrated on a right side of the vehicle 10. Although the doors for the left side of the vehicle are not illustrated, the left side doors may generally be a mirror image of the right side doors 20, 22 because the vehicle 10 may be generally symmetrical. The passenger compartment 18 is generally elevated relative to an underlying support surface 24 upon which the vehicle 10 travels.

The front end 14 of the vehicle 10 includes the area forward of the passenger compartment 18 in the longitudinal direction. As illustrated in FIG. 1, the front end 14 includes a hood 26 defining an engine compartment 28 therebeneath. The front end also includes front quarter panels 30 on opposed lateral sides of the vehicle 10. Each quarter panel 30 defines a front wheel well is illustrated on a right side of the vehicle 10. The left quarter panel is generally a mirror image. The engine compartment 28 is located laterally between the quarter panels 28.

The front end 14 also includes a front fascia 34. The front fascia 34 is generally located forward of the hood 26 and quarter panels 28. The front fascia 34 includes the front grille 36 and the bumper 38. The front grille 36 defines an opening to the engine compartment 28 in order to allow airflow into the air induction system and for cooling of the engine compartment 28. The grille 36 may be designed for vehicle styling and aesthetic appeal and may also include the vehicle manufacturer logo or may have ornamental design characteristics.

The bumper 38 provides energy absorption in the event of a front impact crash. As such, the bumper 38 may extend forward of the grille 36, or as illustrated, the bumper 38 may be generally flush with the grille 36.

Figure 2:
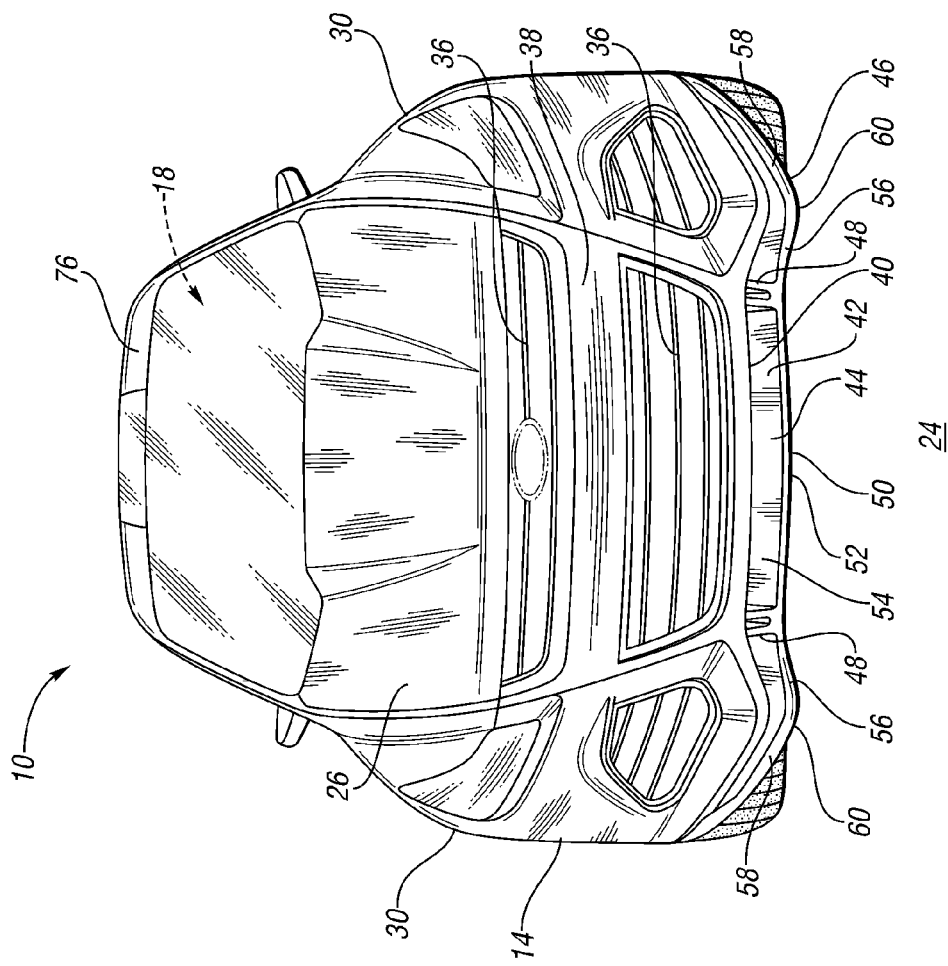
FIG. 2 is a front perspective view of the passenger vehicle of FIG. 1.

FIG. 2 illustrates the front perspective view of the passenger vehicle 10 including the front splitter 12. The front splitter 14 may be mounted adjacent a lower surface 40 of the bumper 38 or the front fascia 14. The front splitter 12 is mounted to the bumper 38 along a top surface 42 of the splitter panel 12. The splitter panel 12 may be mounted an offset distance from the front bumper 38 so that the splitter 12 is not flush with the bumper 38 in the vertical direction. An airflow opening 44 is defined between the front fascia 34 and the top surface 42 of the splitter panel in order to direct air under and along the underbody 46 of the vehicle 10 through the airflow opening 44.

Unlike typical splitters which extend from the bumper and are located close to the ground to prevent air from flowing underneath the vehicle, utility passenger vehicles must maintain a minimum ground clearance in order to prevent colliding with obstacles. Therefore, the front splitter panel 12 extends a minimal distance from the bumper 38 and instead prevents lift and generates a downward force by directing airflow under the vehicle 10 through the airflow opening 44.

Figure 5:
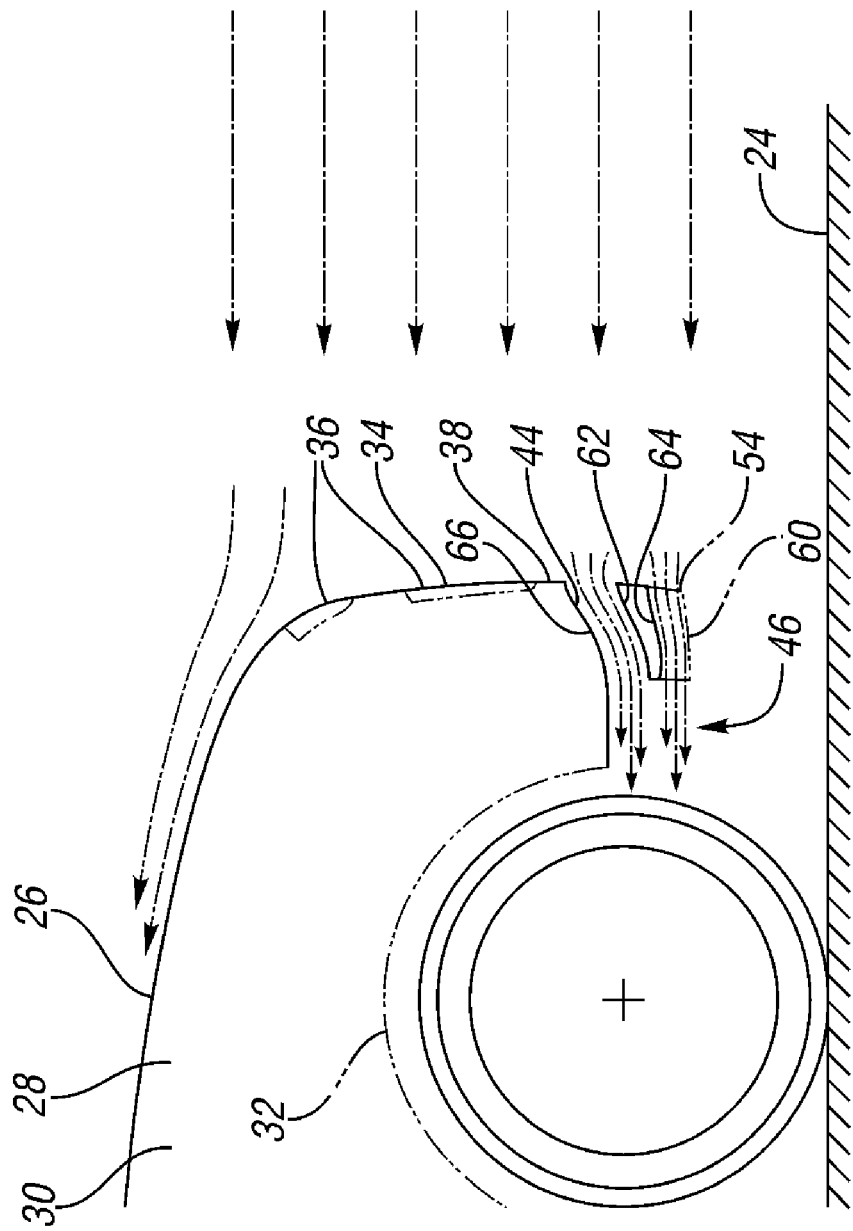
FIG. 5 is a exemplary side section view along section 5-5 of FIG. 2 according to an embodiment of the present invention.

FIG. 5 illustrates a side section view along section 5-5 of FIG. 2 according to an embodiment of the present invention. The airflow opening 44 constricts oncoming air along the front end 14 of the vehicle 10. The airflow opening 14 creates somewhat of a Venturi effect where pressure is decreased as it flows through the constriction of the airflow opening 44. Therefore, the airflow opening 44 creates a region of low pressure which adds to a downward force on the splitter panel 12.

The airflow opening 44 may be defined by the offset distance between the front fascia 34 and the top surface 42 of the splitter 12. The airflow opening 44 may be defined along the entire length of the splitter panel 12 between the front quarter panels 30. Alternatively, the airflow opening 44 may be defined along only a portion of the top surface 42 in order to create a further constriction by having a smaller opening. For example, the splitter 12 may be mounted to the front fascia 34 with attachment arms 48 which are spaced apart. The airflow opening 44 is defined only between the attachment arms 48 along a central portion 50 of the splitter panel 12.

Referring again to FIG. 2, the splitter panel 12 may also include a contoured bottom surface 50. Whereas typical splitters are parallel to the ground 24, the splitter panel 12 may be contoured to provide additional clearance for utility vehicles 10. The contoured bottom surface 52 may define an elongated recess along the central portion 50 of the splitter panel 12. The elongated recess 54 may define a second constriction for oncoming air along the front end 14 of the vehicle 10. Similar to the airflow opening 14, the elongated recess 54 may create somewhat of a Venturi effect where pressure is decreased as it flows through the constriction of the elongated recess 54. Therefore the elongated recess 54 also creates a region of low pressure.

By defining the airflow opening 44 and the elongated recess 54 along the central portion 50 of the front end 14, the high velocity, low pressure oncoming air is directed under the underbody 28 along a midline of the vehicle 10 and away from the tires where the drag is less. Consequently, the central portion 50 is inboard of the tires and wheel wells 32.

In one embodiment, the airflow opening 44 is defined at least along the top surface 42 corresponding to the elongate recess 54. The airflow opening 44 may be the same lateral width as the elongated recess 54 and extend along the central portion 50 adjacent each other. It is also contemplated that the top surface may be contoured in the lateral direction to be generally parallel to the bottom surface 52.

The elongated recess 54 is defined by a pair of wall portions 56 along the bottom surface 52. The wall portions 56 may be angled outboard in the lateral direction and downward from the central portion 50. The bottom surface 52 may also include a pair of second wall portions 58 connected to the first wall portions 56 to define a pair of convex protrusions 60 along the bottom surface at the distal ends of the splitter panel 12. The second wall portion 58 may be angled outboard and upward from the first wall portion 56.

In one embodiment, the front splitter 12 may not extend forward in the longitudinal direction of the bumper 38. In another embodiment, while the central portion 50 of the splitter panel 12 may not extend beyond the front fascia 34 in the forward direction, the convex protrusions 60 are angled forward of the front fascia 34.

Referring again to FIG. 5, the front splitter panel 12 may have a top curvature shape 62 in the longitudinal direction along the top surface 42. The top curvature shape 62 is formed along the airflow opening 44 thereby directing airflow under the vehicle 10. The splitter panel 12 may also have a bottom curvature shape 64 in the longitudinal direction along the bottom surface 52. The bottom curvature shape 64 is formed along the elongated recess thereby directing airflow under the vehicle. The lower surface 40 of the bumper 38 or fascia 34 may also have a lower curvature shape 66 in the longitudinal direction along the airflow opening 44.

The top and bottom and lower curvature shapes 62, 64, 66 may be designed in order to preserve laminar flow along the underbody 46 and diffuse airflow. The top, bottom and lower curvature shapes 62, 64, 66 may be developed according to an empirical data and iterative airflow testing in a wind tunnel or computer model. As such, the top and bottom and lower curvature shapes 62, 64, 66 may be generally parallel to each other. Alternatively, the top and bottom and lower curvature shapes 62, 64, 66 may have independent curvature profiles. The curvature shapes may be defined so that the splitter 12 effectiveness is maximized when airflow being directed to the vehicle underbody 46 remains laminar and smooth. Providing laminar underbody 46 airflow reduces drag and therefore allows the vehicle aerodynamic efficiency to remain generally unaffected.

The top and bottom curvature shapes 62, 64 may extend a distance rearward under the vehicle 10 to align with the underbody profile 46. The longer the constriction regions formed by the airflow opening 44 and the elongated recess 54, the more downward force that may be generated. The underbody 46 may also be formed with a tunnel portion (not illustrated) which may keep airflow speed high along the length of the underbody 46. It is contemplated that the tunnel portion may be formed by underbody structure, such as a deployable rocker panel 68. The disclosure of a deployable rocker panel 68 is disclosed in application Ser. No. 12/985,069 which is incorporated by reference herein in its entirety.

Figure 3:
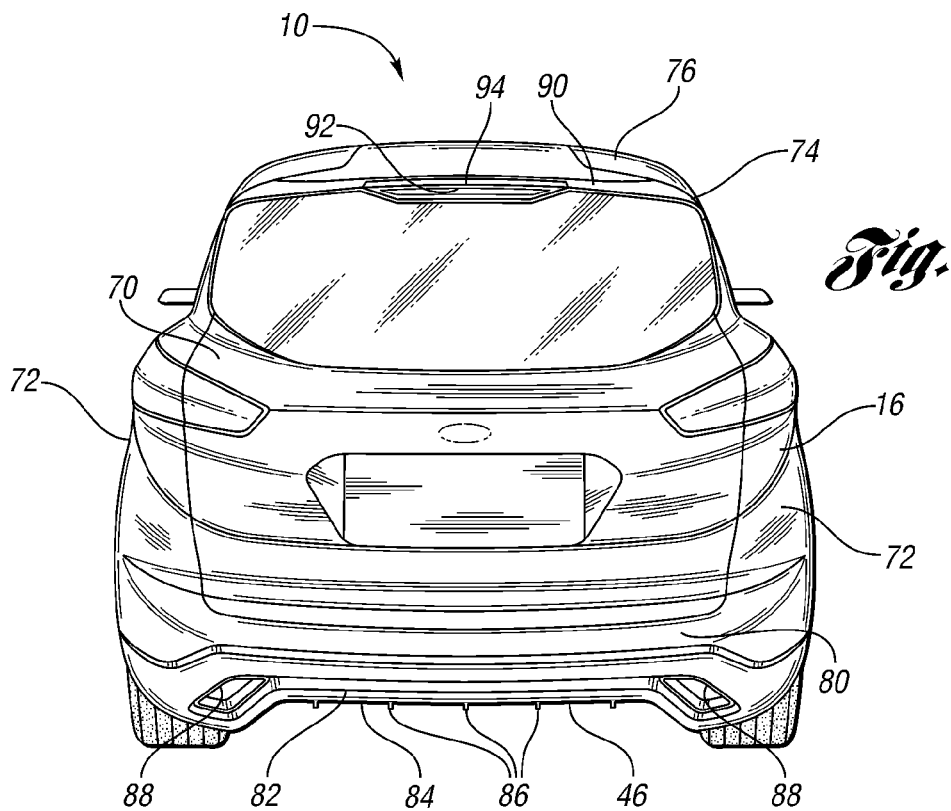
FIG. 3 is a rear perspective view of the passenger vehicle of FIG. 1.
Figure 4:
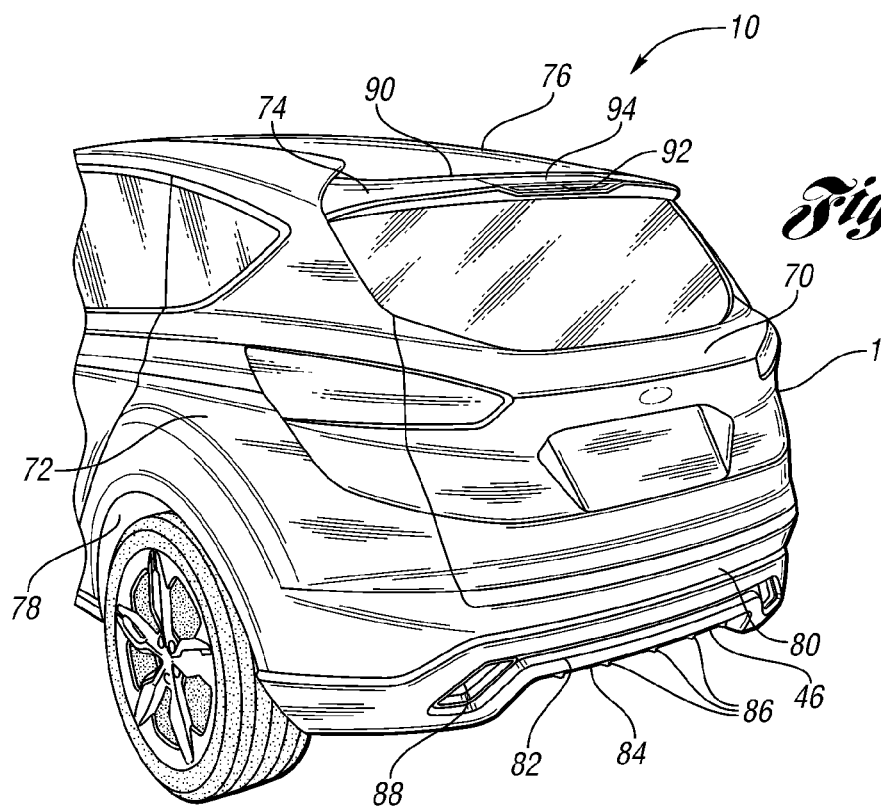
FIG. 4 is a rear side perspective view of the passenger vehicle of FIG. 1.

FIGS. 3 and 4 illustrate a rear perspective view of the passenger vehicle 10. The rear end 16 of vehicle 10 may also include aerodynamic features which may cooperate with the front splitter 12 to improve the fuel efficiency, safety and handling of the passenger vehicle 10.

The rear end 16 of the vehicle 10 may include a rear hatch 70 which may provide access to cargo space or the passenger compartment 18. The rear hatch 70 is defined laterally between the rear quarter panels 72 on opposed lateral sides of the vehicle 10 and may be attached to a rear body panel 74 or the roof 76. The rear quarter panel 72 defines the rear wheel well 78 and is illustrated on a right side of the vehicle 10. The left rear quarter panel is generally a mirror image of the right.

The rear end 16 also includes a rear bumper 80. The rear bumper 80 provides energy absorption in the event of a rear impact crash. As such, the bumper 38 may protrude rearward from the profile of the rear hatch 70 and quarter panels 72.

The rear end 16 may also include a rear fin 82 disposed below the rear bumper 80. The rear fin 82 may have an upswept contour surface 84 that extends from the underbody 46 to the rear bumper 80 and may also include raised fin portions 86 which follow the upswept contour 84. The rear fin 82 may act as a diffuser by improving the transition area between the high-velocity airflow underneath the vehicle 10 and the atmosphere behind the vehicle 10. The rear fin 82 may include exhaust outlets 88 formed therein.

The rear end 16 may also include a rear spoiler 90 adjacent the roof 76 of the vehicle 10. The rear spoiler 90 may be mounted along an upper portion of the rear body panel 74 or the rear hatch 70 adjacent the roof 76. In another embodiment, the rear spoiler 90 may be integrally formed in the rear body panel 74 or the rear hatch 70 to define a rear airflow opening 92. As illustrated in FIGS. 3 and 4, the rear spoiler may also be integrally formed with a high-mount stoplight 94. As such, the rear airflow opening 92 may be formed between the stoplight 94 and the rear body panel The rear spoiler 90 acts to modify the laminar airflow passing over the vehicle 10 by increasing turbulence flowing over the rear spoiler 90 or through the rear airflow opening 92.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A splitter comprising a splitter panel having a top surface adapted to be mounted to a front fascia of a vehicle and contoured and offset from the front fascia to define an airflow opening between the front fascia and the splitter panel to direct air under the vehicle therethrough in order to create a down force on the vehicle, wherein the bottom surface is contoured to define an elongate recess along a central portion the elongate recess defined by a pair of convex protrusions extending from the bottom surface along a pair of distal ends of the splitter panel.

2. The splitter according to claim 1 wherein the wherein the convex protrusions are defined by a first wall portion angled outboard and downward from the central recess and a second wall portion connected to the first wall portion, the second wall portion angled outboard and upward from the first wall portion to define the pair of convex protrusions along the bottom surface.

3. The splitter according to claim 1 wherein the airflow opening is defined at least along the top surface corresponding to the elongate recess.

4. The splitter according to claim 1 wherein the splitter includes at least two attachment arms extending from the top surface adapted to attach the splitter to the bumper.

5. The splitter according to claim 4 wherein the airflow opening is defined between the attachment arms.

6. The splitter according to claim 1 wherein the top surface is contoured to be generally parallel to the bottom surface.

7. The splitter according to claim 1 wherein the convex protrusions are angled forward.

8. A vehicle comprising:
a front fascia have a front grille and a front bumper;
a front splitter panel adapted to be mounted adjacent a lower surface of the front fascia along a top surface of the splitter panel, the splitter panel mounted an offset distance from the front bumper to define an airflow opening between the front fascia and the top surface of splitter panel in order to direct air under the vehicle through the airflow opening, wherein the bottom surface is contoured to define an elongate recess along a central portion the elongate recess defined by a pair of convex protrusions extending from the bottom surface along a pair of distal ends of the splitter panel.

9. The vehicle according to claim 8 wherein a leading edge of the splitter panel does not extend forward of the bumper.

10. The vehicle according to claim 8 wherein the splitter panel has a bottom surface contoured to define an elongated recess along a central portion.

11. The vehicle according to claim 8 further comprising rear fins disposed below the rear bumper.

12. The vehicle according to claim 8 further comprising a rear spoiler mounted adjacent a roof of the vehicle.

13. The vehicle according to claim 12 wherein the rear spoiler is integrally formed in a rear body panel to define a rear airflow opening.

14. The vehicle according to claim 13 wherein the rear spoiler is formed with a high-mount stoplight, the airflow opening formed between the stoplight and the rear body panel.

15. The vehicle according to claim 8 wherein the wherein the convex protrusions are defined by a first wall portion angled outboard and downward from the central recess and a second wall portion connected to the first wall portion, the second wall portion angled outboard and upward from the first wall portion to define the pair of convex protrusions along the bottom surface.

16. The splitter according to claim 8 wherein the splitter panel does not extend forward of the front fascia.

17. A splitter comprising a splitter panel adapted to be mounted to a front fascia of a vehicle along a top surface, a bottom surface contoured to define an elongated recess along a central portion, the panel mounted an offset distance from the fascia to define an airflow opening between the fascia and the panel to direct air under the vehicle through the airflow opening wherein the panel does not extend forward of the fascia.

18. The splitter according to claim 17 wherein the bottom surface is contoured to define an elongate recess along a central portion the elongate recess defined by a pair of convex protrusions extending from the bottom surface along a pair of distal ends of the splitter panel.

19. The splitter according to claim 17 wherein the top surface is contoured to create a downward force on the vehicle.

\* \* \* \* \*